United States Patent
Kandiyanallur et al.

(10) Patent No.: US 11,422,743 B2
(45) Date of Patent: Aug. 23, 2022

(54) DISTRIBUTED STORAGE ORPHAN SCAN

(71) Applicant: SAP SE, Walldorf (DE)

(72) Inventors: Vivek Kandiyanallur, San Francisco, CA (US); Jia Feng, Pleasanton, CA (US); Alexander Chernavin, San Carlos, CA (US); Chitong Chung, Mountain View, CA (US); Shyam Sunder Reddy Avula, San Ramon, CA (US); Xin Guo, Fremont, CA (US); Scott Hamilton, Aldie, VA (US); Clay Jacobs, Hillsborough, CA (US); Christopher de Castro, Farmington, MN (US); Kaushik Ghosh, Santa Clara, CA (US)

(73) Assignee: SAP SE, Walldorf (DE)

( * ) Notice: Subject to any disclaimer, the term of this patent is extended or adjusted under 35 U.S.C. 154(b) by 37 days.

(21) Appl. No.: 16/896,033

(22) Filed: Jun. 8, 2020

(65) Prior Publication Data
US 2021/0318834 A1 Oct. 14, 2021

(30) Foreign Application Priority Data
Apr. 14, 2020 (IN) .............................. 202011016128

(51) Int. Cl.
*G06F 3/06* (2006.01)
(52) U.S. Cl.
CPC .......... *G06F 3/0659* (2013.01); *G06F 3/0604* (2013.01); *G06F 3/067* (2013.01); *G06F 3/0652* (2013.01)

(58) Field of Classification Search
CPC .... G06F 3/0659; G06F 3/0604; G06F 3/0652; G06F 3/067
See application file for complete search history.

(56) References Cited

U.S. PATENT DOCUMENTS

| | | | |
|---|---|---|---|
| 9,588,977 B1 * | 3/2017 | Wang | G06F 16/13 |
| 9,727,470 B1 * | 8/2017 | Cande | G06F 12/084 |
| 9,959,280 B1 * | 5/2018 | Whitehead | H04L 67/1097 |
| 10,706,014 B1 * | 7/2020 | Gupta | G06F 3/064 |
| 2008/0307175 A1 * | 12/2008 | Hart | G06F 11/1458 |
| | | | 711/162 |

(Continued)

OTHER PUBLICATIONS

First Examination Report for related IN Application # 202011016128, dated Feb. 24, 2022.

*Primary Examiner* — Ryan Bertram
(74) *Attorney, Agent, or Firm* — Fountainhead Law Group P.C.

(57) ABSTRACT

A distributed storage system includes a primary storage system and a secondary storage system. The secondary storage system stores the actual data and the primary storage system stores metadata for the actual data. The metadata references at the primary storage system may be deleted without deleting the corresponding data at the secondary storage system. Snapshots of the metadata at the primary storage system are sent to the secondary storage system. The secondary storage system can compare two metadata snapshots received from the primary storage in order to determine whether data stored at the secondary storage system has been deleted at the primary storage system for longer than a retention period. Such data may be deleted to free up storage space at the secondary storage server.

17 Claims, 5 Drawing Sheets

(56) References Cited

U.S. PATENT DOCUMENTS

| | | | |
|---|---|---|---|
| 2009/0055607 A1* | 2/2009 | Schack | G06F 11/1435 |
| | | | 711/162 |
| 2009/0319582 A1* | 12/2009 | Simek | G06F 11/1469 |
| 2016/0292178 A1 | 10/2016 | Manville et al. | |
| 2020/0034471 A1* | 1/2020 | Danilov | G06F 16/2246 |
| 2020/0233837 A1* | 7/2020 | Morton | G06F 16/128 |
| 2021/0117120 A1* | 4/2021 | Edwards | G06F 11/1451 |
| 2021/0117276 A1* | 4/2021 | Federwisch | G06F 11/1451 |
| 2021/0263658 A1* | 8/2021 | Kusters | G06F 3/0619 |

\* cited by examiner

DISTRIBUTED STORAGE ORPHAN SCAN

CROSS REFERENCE TO RELATED APPLICATIONS

The present application claims priority to Indian provisional application number 202011016128, filed Apr. 14, 2020, the contents of which are incorporated herein by reference in its entirety.

BACKGROUND

The present disclosure pertains to distributed storage systems and in particular to orphan scans of data stored in distributed storage systems.

Cloud computing applications running on cloud platforms have been developed to meet the expanding software functionality requirements of large organizations. The cloud platform may include computer systems, storage systems, and networking infrastructure to provides software applications, tools, and services to users. The application data and data processing may be performed by the cloud platform instead of by the user's personal computer device. However, the storage demands of certain cloud computing applications has outgrown the capacity provided by conventional cloud platforms. There is a need for improved storage solutions.

The present disclosure addresses these issue and others, as further described below.

SUMMARY

One embodiment provides a computer storage system. The computer storage system includes one or more processors. The computer storage system also includes machine-readable medium coupled to the one or more processors. The machine-readable medium stores computer program code comprising sets instructions executable by the one or more processors. The instructions are executable to store a plurality of data objects and a plurality of data references including a data reference to each data object of the plurality of data objects. The instructions are further executable to receive, from a first storage system, a first metadata snapshot including a first set of metadata references to a first subset of the plurality of data objects. The instructions are further executable to determine a second metadata snapshot based on a second creation date of the second metadata snapshot being older than a first creation date of the first metadata snapshot by at least a retention period for the plurality of data objects. The second metadata snapshot includes a second set of metadata references to a second subset of the plurality of data objects. The instructions are further executable to determine a third subset of the plurality of data objects based on the plurality of data references, the first set of metadata references, and the second set of metadata references. Each data object of the third subset is not included in the first subject or the second subset. The instructions are further executable to delete the third subset of the plurality of data objects.

Another embodiment provides one or more non-transitory computer-readable medium storing computer program code. The computer program code includes sets of instructions to store a plurality of data objects and a plurality of data references including a data reference to each data object of the plurality of data objects. The computer program code further includes sets of instructions to receive, from a first storage system, a first metadata snapshot including a first set of metadata references to a first subset of the plurality of data objects. The computer program code further includes sets of instructions to determine a second metadata snapshot based on a second creation date of the second metadata snapshot being older than a first creation date of the first metadata snapshot by at least a retention period for the plurality of data objects. The second metadata snapshot includes a second set of metadata references to a second subset of the plurality of data objects. The computer program code further includes sets of instructions to determine a third subset of the plurality of data objects based on the plurality of data references, the first set of metadata references, and the second set of metadata references. Each data object of the third subset is not included in the first subject or the second subset. The computer program code further includes sets of instructions to delete the third subset of the plurality of data objects.

Another embodiment provides a computer-implemented method. The method includes storing, by a computer storage system, a plurality of data objects and a plurality of data references including a data reference to each data object of the plurality of data objects. The method further includes receiving, by the computer storage system from a first storage system, a first metadata snapshot including a first set of metadata references to a first subset of the plurality of data objects. The method further includes determining, by the computer storage system, a second metadata snapshot based on a second creation date of the second metadata snapshot being older than a first creation date of the first metadata snapshot by at least a retention period for the plurality of data objects. The second metadata snapshot includes a second set of metadata references to a second subset of the plurality of data objects. The method further includes determining, by the computer storage system, a third subset of the plurality of data objects based on the plurality of data references, the first set of metadata references, and the second set of metadata references. Each data object of the third subset is not included in the first subject or the second subset. The method further includes deleting, by the computer storage system, the third subset of the plurality of data objects.

The following detailed description and accompanying drawings provide a better understanding of the nature and advantages of the present disclosure.

DETAILED DESCRIPTION

In the following description, for purposes of explanation, numerous examples and specific details are set forth in order to provide a thorough understanding of the present disclosure. Such examples and details are not to be construed as unduly limiting the elements of the claims or the claimed subject matter as a whole. It will be evident, based on the language of the different claims, that the claimed subject matter may include some or all of the features in these examples, alone or in combination, and may further include modifications and equivalents of the features and techniques described herein.

As mentioned above, cloud computing applications running on cloud platforms have been developed to meet the expanding software functionality requirements of large organizations. The cloud platform may include computer systems, storage systems, and networking infrastructure to provides software applications, tools, and services to users. The application data and data processing may be performed by the cloud platform instead of by the user's personal computer device. However, the storage demands of certain cloud computing applications has outgrown the capacity provided by conventional cloud platforms. There is a need for improved storage solutions.

Distributed storage systems have been developed to meet these storage demands. A distributed storage system may store application data across several computers or servers. In addition, certain distributed storage system may store certain data in a primary system and other related data in a secondary system. The primary system and the secondary system may both include separate distributed storage systems (e.g., storing data across different groups of computers or servers). In such cases data management, such as backup and restore functionality, performed by the primary system may be distinct and separate from the data management performed by the secondary system.

Figure 1:
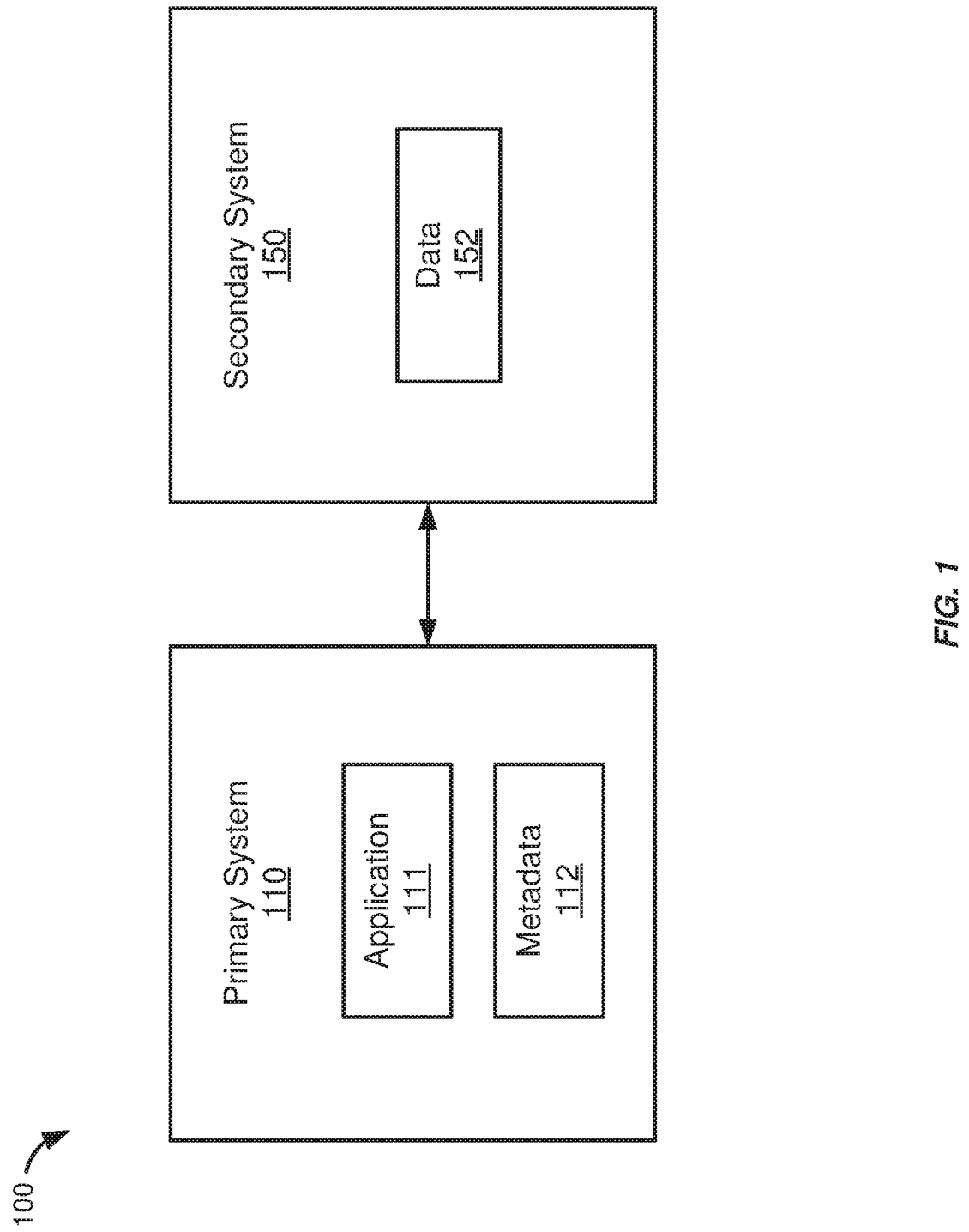
FIG. 1 shows a diagram of a distributed storage system, according to an embodiment.

FIG. 1 shows a diagram of a distributed storage system 100, according to an embodiment. The distributed storage system 100 includes a primary system 110 and a secondary system 150. The primary system 110 may store data across one or more computers (e.g., server computers). The secondary system 150 may store other data across one or more computers (e.g., server computers). In some implementations, the primary system 110 can be a cloud storage system (e.g., a storage system of a cloud platform). For example, the primary system 110 may be a private cloud storage system as described below with respect to FIG. 3. In some implementations, the secondary system 150 can also be a cloud storage system (e.g., a storage system of a cloud platform). For example, the secondary system 150 may be a hyper scale public cloud storage system as described below with respect to FIG. 3.

The primary system 110 may be referred to as "primary" because it an application 111 is provided by the primary system. The secondary system 150 may be referred to as "secondary" because it does not provide access to the application 111. In some implementations, the application 111 may be a cloud computing application accessed by users through their own computer devices (e.g., personal computer, laptop, smartphone, or tablet). In the distributed storage system 100, the secondary system 150 stores data 152 for the application 111 instead of the primary system 110 storing it. In some implementations, the secondary system 150 may store the data 152 as a Binary Large Object (BLOB).

Instead of storing the data 152 for the application, the primary system 110 stores metadata 112 of the data 152. The metadata 112 includes information about the application data 152 and references to the data within the application data 152. A "reference" to data refers to a value or address usable to access a particular set of data in storage. In this implementation, the references in the metadata 112 may be used to access particular sets of the data 152 stored at the secondary system 150. In some implementations, the data 152 may include documents or records and the metadata 112 may further include information indicating a document identifier, a user identifier or name that created of the document, a creation date of when the document was created, a user identifier or name that uploaded the document, an upload date of when the document was uploaded, a user identifier or name that manages or owns the document. The metadata 112 may enable the application 111 to function the same as if the data 152 was stored at the primary system 110 (e.g., the application calls may not have to change even though the storage location changed).

The secondary system 150 may store the data 152 instead of the primary system 110 storing it because the secondary system 150 may be more capable of handling increasing storage demands compared to the primary system 110. For example, the secondary system 150 may have a greater storage capacity compared to the primary system 110. In addition, the secondary system 150 may be configured to automatically scale storage resources for the application 111 in response to an increased demand for storage of data 152, while the primary system 110 may not be to scale resources in this way. The secondary system 150 may also be able to provide reduced storage costs compared to the primary system 110.

While distributed storage systems and hyperscale storage system may be capable of providing storage to meet the demand of certain cloud applications, the storage system may suffer from storage inefficiencies caused by the disconnect in data management between the primary storage system 110 and the secondary storage system 150. For example, when information is deleted by users of the application 111, the primary system 110 may delete corresponding metadata 112 without notifying the secondary system 150 of the deletion. The secondary system 150 may not be notified of each deletion as the application 111 constant notifications and processing of the notifications may lead to decreased efficiency, especially in implementations where hundreds or thousands of users are accessing the application 111. However, without notification of the deletion, the secondary system 150 may store data that can no longer be accessed by the application 111 on the primary system 120, wasting both storage resources for that data and computing resources used in maintaining that data. Such data may be referred to as an "orphan" because it exist without any reference to access or maintain it.

The present disclosure provides techniques for distributed storage orphan scan—a scan of the storage system to identify data stored at the secondary system 150 that does not have a reference to it available at the primary system 110, meaning that the primary system 110 may not be able to access the orphan data. Such orphan data may be deleted in order to reduce the amount of storage resources used by the secondary system 150. In some embodiments, orphan data may be maintained by the secondary system 150 for a predetermined retention period in order to maintain data to support backup and restore functionality performed by the primary storage system 110, as further discussed below.

Figure 2:
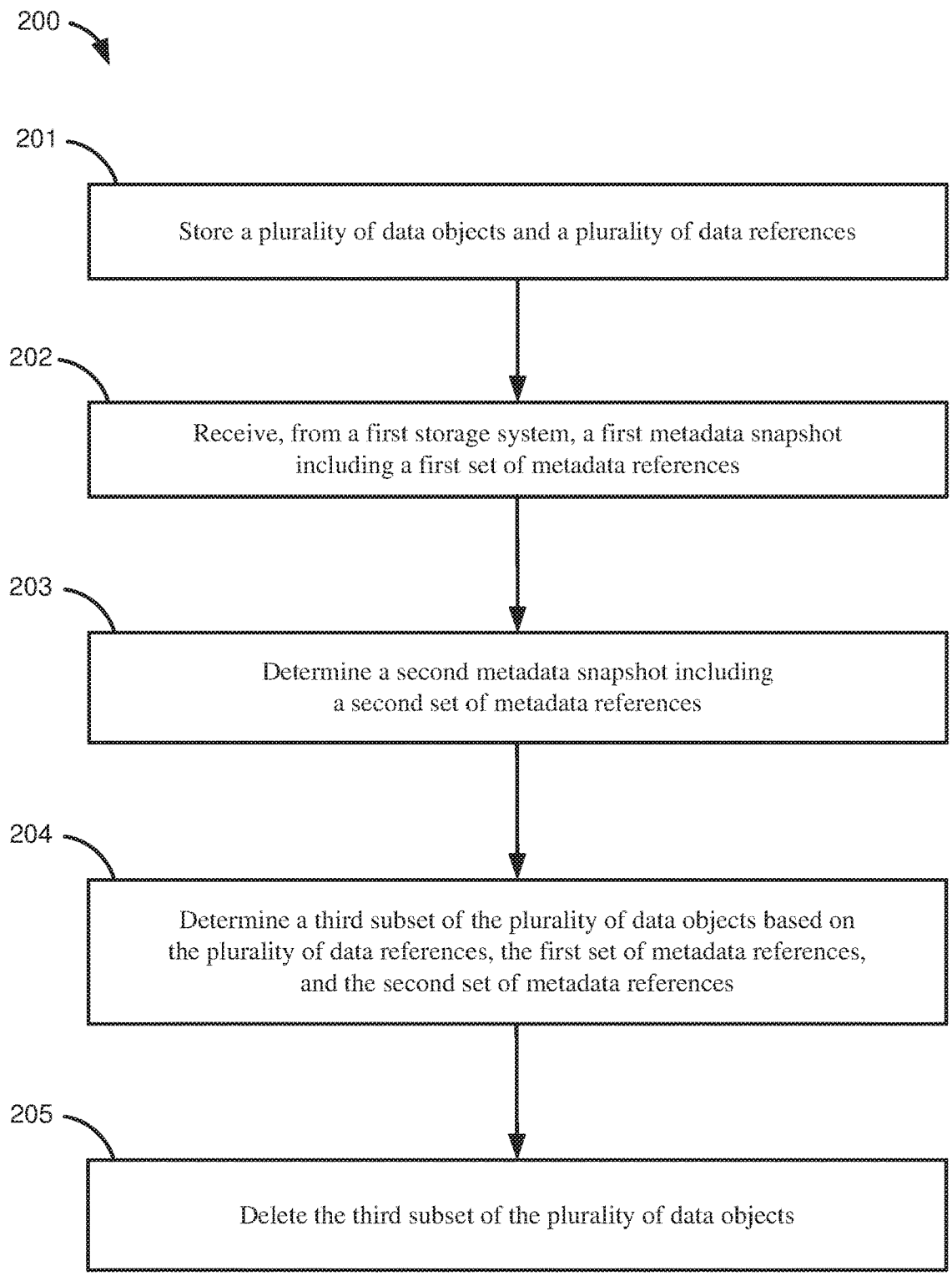
FIG. 2 shows a flowchart of a computer storage method, according to an embodiment.

FIG. 2 shows a flowchart 200 of a computer storage method, according to an embodiment. The computer storage method of FIG. 2 may provide orphan scan functionality for a computer storage system, such as the distributed storage system 100 of FIG. 1 or the hybrid cloud storage system 300 of FIG. 3. For example, the method of FIG. 2 may be performed by the secondary system 150 of FIG. 1 or the method may be performed by the hyperscale storage system 350 of FIG. 3. The method of FIG. 2 provides efficient storage of data at the computer storage system while also maintaining data to ensure backup and restore functionality for a first storage system.

At 201, the method stores a plurality of data objects and a plurality of data references. The plurality of data references includes a data reference to each data object of the plurality of data objects. In some implementations, the data object may be a Binary Large Objects (BLOBs). In some implementations, the plurality of data references may include one or more data reference to one or more respective data objects of the plurality of data objects. The data may be for an application provided by a first storage system (e.g., primary system 110 of FIG. 1 or private cloud storage system 310 of FIG. 3).

At 202, the method receives, from the first storage system, a first metadata snapshot including a first set of metadata references to a first subset of the plurality of data objects. The metadata snapshot may be a list of references included in the metadata stored at the first storage system. The metadata stored at the first storage system may also include information indicating a document identifier, a user identifier or name that created of the document, a creation date of when the document was created, an identifier, a user identifier or name that uploaded the document, a name of a user, an upload date of when the document was uploaded, a user identifier or name that manages or owns the document. In some implementations, the snapshot sent to the computer storage system includes the references without including identifiers of the user or name that created or uploaded the document, or the date that the document was created or uploaded.

At 203, the method determines a second metadata snapshot including a second set of metadata references. The second set of metadata references are references to a second subset of the plurality of data objects. The second metadata snapshot may be an earlier snapshot taken by the first storage system. As mentioned herein, a retention period may be established such that the data stored at the computer system may be retained for a particular time period during which backup and restore functionality may be performed by the first storage system. The retention period may be 30 days, 60 days, or 90 days, for example. In order to provide backup and restore functionality for the retention period, the second metadata snapshot may be determined based on a second creation date of the second metadata snapshot being older than a first creation date of the first metadata snapshot by at least a retention period for the plurality of data objects. For instance, the second metadata snapshot may be the youngest (by creation date) snapshot that is older than the first snapshot by at least the retention period.

For example, if the retention period is 90 days and there are four stored snapshots including snapshots created 7, 60, 100, and 120 days ago, respectively, then the "first snapshot" received at 202 may be the most recent (youngest) snapshot created 7 days ago and the "second snapshot" determination at 203 may be the snapshot created 100 days ago as it is older than the first snapshot by at least 90 days and it is also younger than the snapshot created 120 days ago.

At 204, the method determines a third subset of the plurality of data objects based on the plurality of data references, the first set of metadata references, and the second set of metadata references. Each data object of the third subset may not be included in the first subject or the second subset. For instance, the metadata for the data objects in the third subset may have been deleted at the first storage system. That is, the data objects in the third subset are orphaned data.

At 205, the method deletes the third subset of the plurality of data objects. As such, data storage resources at the computer system are reduced while still maintaining the data for the retention period.

In some implementations the method can further receive a notification from the first storage system and delete one or more snapshots received from the first storage system.

In some implementations, the method can further obtain deletion statistics of the first storage system. The deletion statistics can indicate how frequently data is being deleted. In some cases, more frequent data deletions may increase the probability of orphaned data. In such implementations, the method can further compare the deletion statistics to one or more predetermined thresholds. The predetermined thresholds may set a limit on how much garbage or data a particular application or organization may have. In such implementations, the receiving of the first metadata snapshot from the first storage system may be triggered by a result of the comparing of the deletion statistics to the one or more predetermined thresholds.

In some implementations, the first snapshot comprises a plurality of data chunks and the method can further obtain the plurality of data chunks of the first snapshot and validate the plurality of data chunks of the first snapshot. The snapshot may be provided in chunks as it may be a large amount of data and it may be sent over a network.

In some implementations, the second creation date of the second metadata snapshot is younger than the creation dates of other metadata snapshots that are older than the first creation date of the first metadata snapshot by at least the retention period and the method can further delete the second snapshot and the other metadata snapshots.

In some implementations, the computer storage system is a hyperscale storage system. In some implementations, the first storage system is a cloud storage system.

As discussed above, a distributed storage system can store data for an application in one storage system while storing the metadata for the data in another storage system. Furthermore, the distributed storage system can maintain data to ensure backup and restore functionality as discussed above. In some implementations, the distributed storage system can be a hybrid cloud storage system including a private cloud storage system and a hyperscale public cloud storage system.

Figure 3:
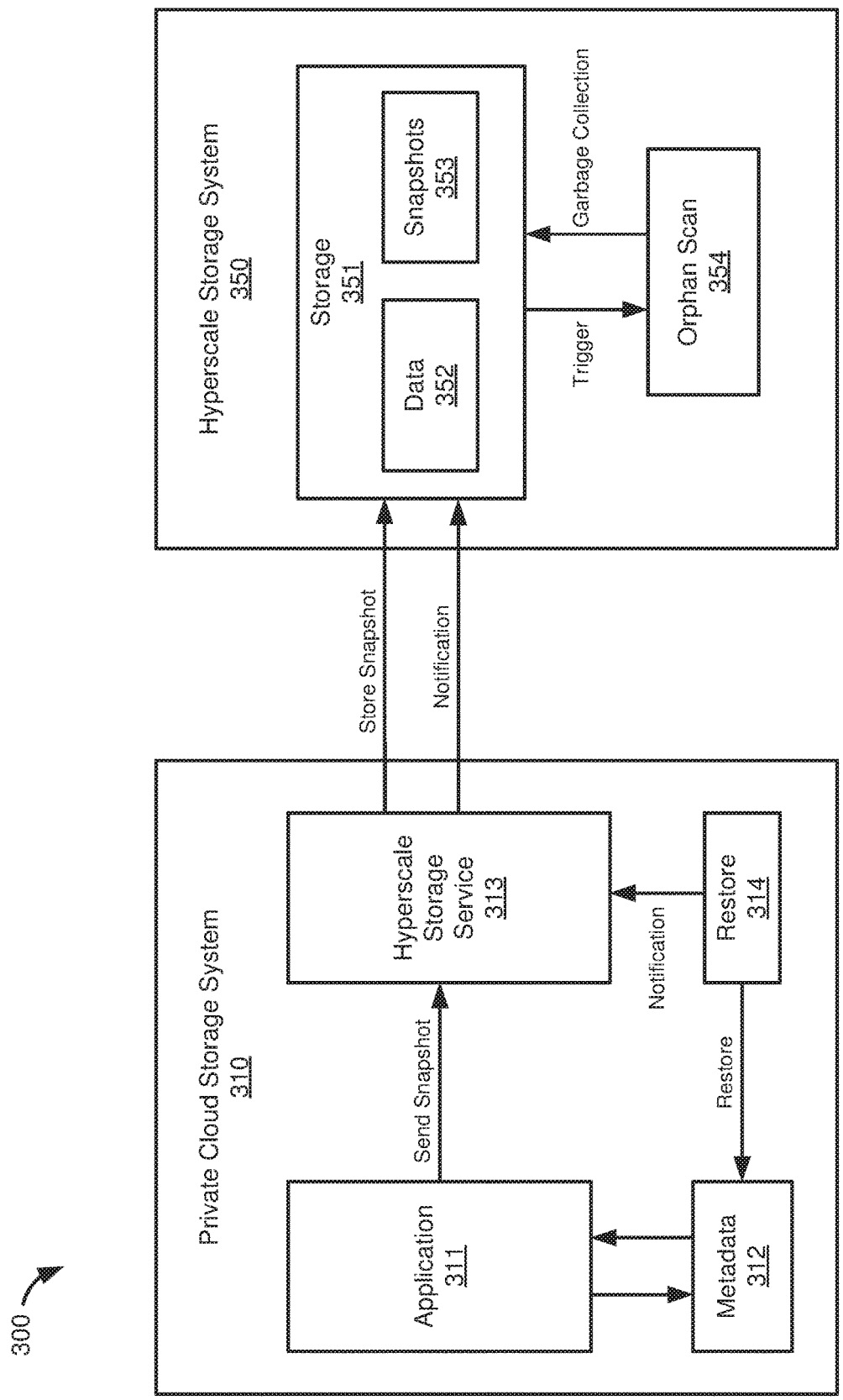
FIG. 3 shows a diagram hybrid cloud storage system, according to an embodiment.

FIG. 3 shows a diagram hybrid cloud storage system 300, according to an embodiment. The hybrid cloud storage system 300 includes a private cloud storage system 310 and a hyperscale storage system 350. Similar to FIG. 1 discussed above, the application 311 is provided by one system that stored the metadata 312 while another system stored the data 352 for the application.

The private cloud storage system 310 may be referred to as "private" because it may be operated by or for a particular entity or organization. The hyperscale storage system 350 may be referred to as a "public" cloud because it may provide storage for multiple entities or organizations. Generally, a "hyperscale" storage system is a type of distributed storage system. A hyperscale storage system may be capable of scaling resources appropriately in response to increased storage demands. For example, software-defined storage and software-defined networking may be used to enable the hyperscale storage system to scale resources automatically.

The private cloud storage system 310 includes an application 111, metadata 312 for the data of the application 111, a hyperscale storage service 313, and a restore module 314. The application 311 may be a cloud application provided by the private cloud storage system 310 to users of an organization. The metadata 312 includes information about the application's data and references to the data within the application data. A "reference" to data refers to a value or address usable to access a particular set of data in storage. In this implementation, the references in the metadata 312 may be used to access particular sets of the data 352 stored at the hyperscale storage system 350. In some implementations, the data 352 may include documents or records and the metadata 312 may further include information indicating a document identifier, a user identifier or name that created of the document, a creation date of when the document was created, a user identifier or name that uploaded the document, an upload date of when the document was uploaded, a user identifier or name that manages or owns the document. The metadata 312 may enable the application 311 to function the same as if the data 352 was stored at the primary system 310 (e.g., the application calls may not have to change even though the storage location changed.

The hyperscale storage service 313 of the private cloud storage system 310 enables the private cloud storage system 310 to communicate with and make requests to the hyperscale storage system 350. For example, the private cloud storage system 310 can send snapshots of the metadata 312 to the hyperscale storage service 313, which may then send the snapshot to the hyperscale storage system 350 for storage.

The restore module 314 may also perform restoration of metadata that has been backed up. For example, the metadata 312 may be periodically backed up at a database server (not shown). If restoration is requested, the restore module may retrieve the metadata and provide the restored metadata to the private cloud storage system 310, replacing metadata 312. The restore request may include a particular date to be used in selecting the snapshot to restore. The restore module 314 may provide a notification of the metadata restoration to the hyperscale storage service 313. The notification indicating that the metadata 312 has been replaced by backup metadata, for example. In response, the hyperscale storage service 313 may provide a notification to the hyperscale storage system 350 to delete one or more stored snapshots received from the private cloud storage system 310. The stored snapshots received from the private cloud storage system 310 may be invalid because of the metadata restoration at the private cloud storage system 310.

The hyperscale storage system 350 may include storage 351 of the data 352 and the snapshots 353. The snapshots 353 may include several metadata snapshots received from the private cloud storage system 310. The hyperscale storage system 350 may perform an orphan scan 354 of the data 352 based on the snapshots 353 to identify orphaned data. The orphan scan 354 may be performed according to a schedule. In some implementations, the orphan scan 354 may be performed in response to receiving a snapshot. The orphan scan 354 may be performed using the method described above with respect to FIG. 2. An example of an orphan scan 354 process is also described below with respect to FIG. 4.

Figure 4:
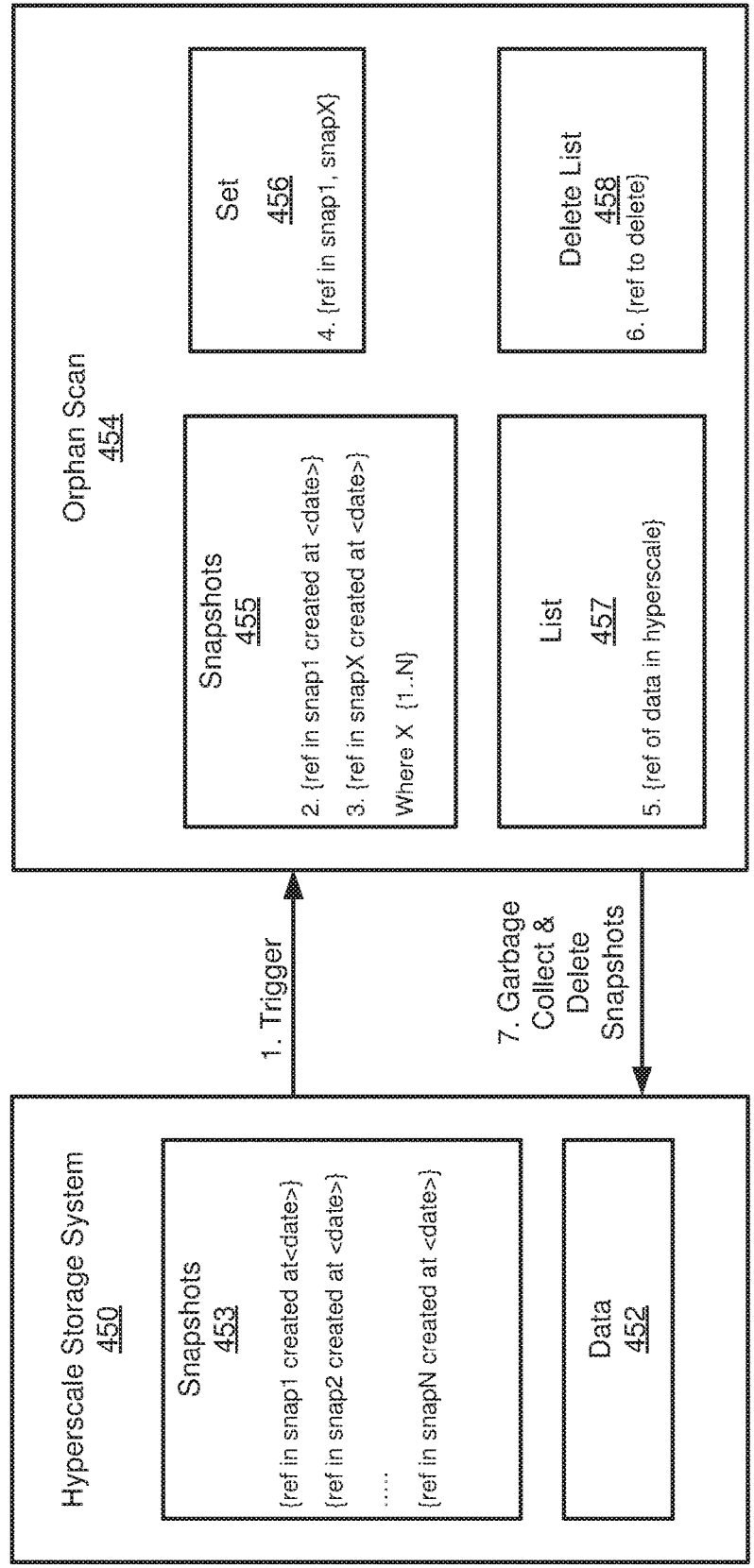
FIG. 4 shows a diagram of an orphan scan process performed at a hyperscale storage system, according to an embodiment.

FIG. 4 shows a diagram 400 of an orphan scan process 454 performed at a hyperscale storage system 450, according to an embodiment. The hyperscale storage system 450 may be configured similar to the hyperscale storage system 350 of FIG. 3. For instance, the hyperscale storage system 450 may store metadata snapshots 455 and data 452 of an application provided by a cloud storage system of a different cloud platform. The snapshots 455 can include references in a first snapshot created at a first date, references in a second snapshot created at a second date, and so on.

The orphan scan process 454 may be triggered at step 1. The orphan scan process 454 may be triggered according to a schedule, for example. At step 2 of the orphan scan process 454, the youngest snapshot is identified by creation date. The chunks of the youngest snapshot may be validated. At step 3 of the orphan scan process 454 the second snapshot is selected from among the other snapshots at later dates. The second snapshot being older than the first snapshot by at least a predetermined retention period. The chunks of the second snapshot may be validated.

At step 4 of the orphan scan process 454, a set 456 containing unique metadata references from both the snapshots 455 is created. At step 5 of the orphan scan process 454, a list 457 of references to the (actual) data stored in the hyper scaler storage system 450 is created. At step 6 of the orphan scan process 454, for each reference in the list 457 of actual data and its creation date older than the newest second snapshot: identify the equivalent meta data reference in the set and if the meta data reference is not found in the set, add it to the delete list. At step 7 of the orphan scan process 454, garbage collect data in the delete list reference from the hyper scaler storage.

Figure 5:
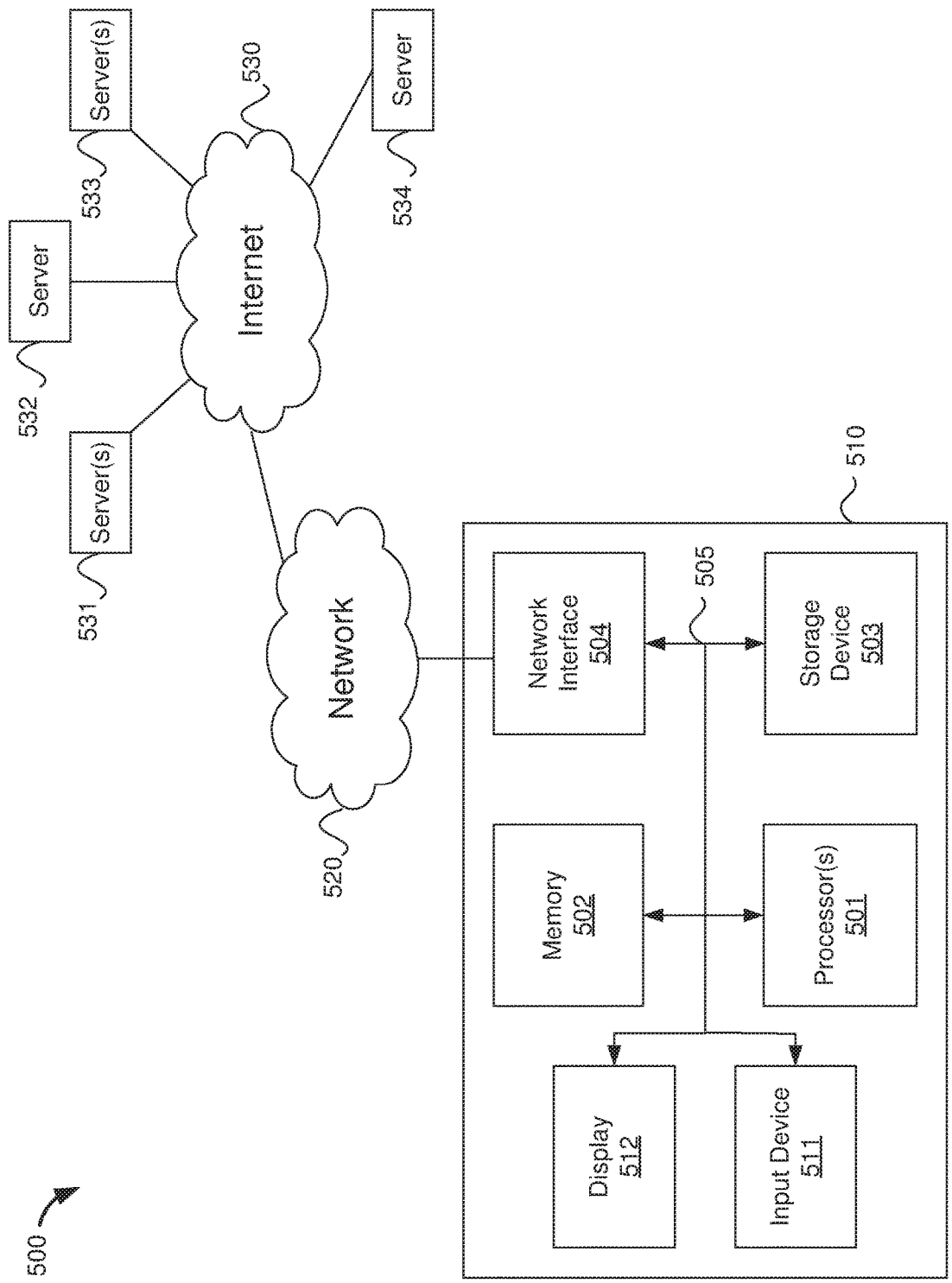
FIG. 5 shows a diagram of hardware of a special purpose computing machine for implementing systems and methods described herein.

FIG. 5 shows a diagram of hardware of a special purpose computing machine for implementing systems and methods described herein. The following hardware description is merely one example. It is to be understood that a variety of computers topologies may be used to implement the above described techniques. The hardware shown in FIG. 5 may be used to implement the distributed storage system described herein.

An example computer system 510 is illustrated in FIG. 5. The computer system 510 includes a bus 505 or other communication mechanism for communicating information, and one or more processor(s) 501 coupled with bus 505 for processing information. The computer system 510 also includes a memory 502 coupled to bus 505 for storing information and instructions to be executed by processor 501, including information and instructions for performing some of the techniques described above, for example. This memory may also be used for storing programs executed by processor(s) 501. Possible implementations of this memory may be, but are not limited to, random access memory (RAM), read only memory (ROM), or both. A storage device 503 is also provided for storing information and instructions. Common forms of storage devices include, for example, a hard drive, a magnetic disk, an optical disk, a CD-ROM, a DVD, a flash or other non-volatile memory, a USB memory card, or any other medium from which a computer can read. Storage device 503 may include source code, binary code, or software files for performing the techniques above, for example. Storage device and memory are both examples of non-transitory computer readable storage mediums.

The computer system 510 may be coupled via bus 505 to a display 512 for displaying information to a computer user. An input device 511 such as a keyboard, touchscreen, and/or mouse is coupled to bus 505 for communicating information and command selections from the user to processor 501. The combination of these components allows the user to communicate with the system. In some systems, bus 505 represents multiple specialized buses, for example.

The computer system also includes a network interface 504 coupled with bus 505. The network interface 504 may provide two-way data communication between computer system 610 and a network 520. The network interface 504 may be a wireless or wired connection, for example. The computer system 510 can send and receive information through the network interface 504 across a local area network, an Intranet, a cellular network, or the Internet, for example. In the Internet example, a browser, for example, may access data and features on backend systems that may reside on multiple different hardware servers 531-534 across the network. The servers 531-534 may be part of a cloud computing environment, for example.

The above description illustrates various embodiments of the present disclosure along with examples of how aspects of the particular embodiments may be implemented. The above examples should not be deemed to be the only embodiments, and are presented to illustrate the flexibility and advantages of the particular embodiments as defined by the following claims. Based on the above disclosure and the following claims, other arrangements, embodiments, implementations and equivalents may be employed without departing from the scope of the present disclosure as defined by the claims.

As used herein, the terms "first," "second," "third," "fourth," "fifth," "sixth," "seventh," "eighth," "ninth," "tenth," etc., do not necessarily indicate an ordering or sequence unless indicated. These terms, as used herein, may simply be used for differentiation between different objects or elements.

The above description illustrates various embodiments of the present disclosure along with examples of how aspects of the particular embodiments may be implemented. The above examples should not be deemed to be the only embodiments, and are presented to illustrate the flexibility and advantages of the particular embodiments as defined by the following claims. Based on the above disclosure and the following claims, other arrangements, embodiments, implementations and equivalents may be employed without departing from the scope of the present disclosure as defined by the claims.

What is claimed is:

1. A computer storage system, comprising:
   one or more processors; and
   machine-readable medium coupled to the one or more processors and storing computer program code comprising sets instructions executable by the one or more processors to:
   store a plurality of data objects and a plurality of data references including a data reference to each data object of the plurality of data objects;
   obtain deletion statistics of a first storage system;
   compare the deletion statistics to one or more predetermined thresholds;
   receive, from the first storage system, a first metadata snapshot including a first set of metadata references to a first subset of the plurality of data objects, the receiving of the first metadata snapshot from the first storage system being triggered by a result of the comparing of the deletion statistics to the one or more predetermined thresholds;
   determine a second metadata snapshot based on a second creation date of the second metadata snapshot being older than a first creation date of the first metadata snapshot by at least a retention period for the plurality of data objects, the second metadata snapshot including a second set of metadata references to a second subset of the plurality of data objects;
   determine a third subset of the plurality of data objects based on the plurality of data references, the first set of metadata references, and the second set of metadata references, each data object of the third subset not being included in the first subset, each data object of the third subset not being included in the second subset; and
   delete the third subset of the plurality of data objects.

2. The computer storage system of claim 1, wherein the computer program code further comprises sets of instructions executable by the one or more processors to:
   receive a notification from the first storage system; and
   delete one or more snapshots received from the first storage system.

3. The computer storage system of claim 1, wherein the first snapshot comprises a plurality of data chunks, wherein the computer program code further comprises sets of instructions executable by the one or more processors to:
   obtain the plurality of data chunks of the first snapshot; and
   validate the plurality of data chunks of the first snapshot.

4. The computer storage system of claim 1, wherein the second creation date of the second metadata snapshot is younger than the creation dates of other metadata snapshots that are older than the first creation date of the first metadata snapshot by at least the retention period.

5. The computer storage system of claim 1, wherein the computer program code further comprises sets of instructions executable by the one or more processors to:
   determine a set of snapshots older than the second creation date of the second snapshot; and
   delete the second snapshot and the set of snapshots.

6. The computer storage system of claim 1, wherein the computer storage system is a hyperscale storage system, and wherein the first storage system is a cloud storage system.

7. One or more non-transitory computer-readable medium storing computer program code comprising sets of instructions to:
   store a plurality of data objects and a plurality of data references including a data reference to each data object of the plurality of data objects;
   obtain deletion statistics of a first storage system;
   compare the deletion statistics to one or more predetermined thresholds,
   receive, from the first storage system, a first metadata snapshot including a first set of metadata references to a first subset of the plurality of data objects, the receiving of the first metadata snapshot from the first storage system being triggered by a result of the comparing of the deletion statistics to the one or more predetermined thresholds;
   determine a second metadata snapshot based on a second creation date of the second metadata snapshot being older than a first creation date of the first metadata snapshot by at least a retention period for the plurality of data objects, the second metadata snapshot including a second set of metadata references to a second subset of the plurality of data objects;
   determine a third subset of the plurality of data objects based on the plurality of data references, the first set of metadata references, and the second set of metadata references, each data object of the third subset not being included in the first subset, each data object of the third subset not being included in the second subset; and
   delete the third subset of the plurality of data objects.

8. The non-transitory computer-readable medium of claim 7, wherein the computer program code further comprises sets of instructions to:
   receive a notification from the first storage system; and delete one or more snapshots received from the first storage system.

9. The non-transitory computer-readable medium of claim 7, wherein the first snapshot comprises a plurality of data chunks, and wherein the computer program code further comprises sets of instructions to:
obtain the plurality of data chunks of the first snapshot; and
validate the plurality of data chunks of the first snapshot.

10. The non-transitory computer-readable medium of claim 7, wherein the second creation date of the second metadata snapshot is younger than the creation dates of other metadata snapshots that are older than the first creation date of the first metadata snapshot by at least the retention period.

11. The non-transitory computer-readable medium of claim 7, wherein the computer program code further comprises sets of instructions to:
determine a set of snapshots older than the second creation date of the second snapshot; and
delete the second snapshot and the set of snapshots.

12. The non-transitory computer-readable medium of claim 7, wherein the computer storage system is a hyperscale storage system, and wherein the first storage system is a cloud storage system.

13. A computer-implemented method, comprising:
storing, by a computer storage system, a plurality of data objects and a plurality of data references including a data reference to each data object of the plurality of data objects;
obtaining, by the computer storage system, deletion statistics of a first storage system;
comparing, by the computer storage system, the deletion statistics to one or more predetermined thresholds;
receiving, by the computer storage system from the first storage system, a first metadata snapshot including a first set of metadata references to a first subset of the plurality of data objects, the receiving of the first metadata snapshot from the first storage system being triggered by a result of the comparing of the deletion statistics to the one or more predetermined thresholds;
determining, by the computer storage system, a second metadata snapshot based on a second creation date of the second metadata snapshot being older than a first creation date of the first metadata snapshot by at least a retention period for the plurality of data objects, the second metadata snapshot including a second set of metadata references to a second subset of the plurality of data objects;
determining, by the computer storage system, a third subset of the plurality of data objects based on the plurality of data references, the first set of metadata references, and the second set of metadata references, each data object of the third subset not being included in the first subset, each data object of the third subset not being included in the second subset; and
deleting, by the computer storage system, the third subset of the plurality of data objects.

14. The computer-implemented method of claim 13, further comprising:
receiving, by the computer storage system, a notification from the first storage system; and
deleting, by the computer storage system, one or more snapshots received from the first storage system.

15. The computer-implemented method of claim 13, wherein the first snapshot comprises a plurality of data chunks, the method further comprising:
obtaining, by the computer storage system, the plurality of data chunks of the first snapshot; and
validating, by the computer storage system, the plurality of data chunks of the first snapshot.

16. The computer-implemented method of claim 13, wherein the second creation date of the second metadata snapshot is younger than the creation dates of other metadata snapshots that are older than the first creation date of the first metadata snapshot by at least the retention period, the method further comprising:
deleting, by the computer storage system, the second snapshot and the other metadata snapshots.

17. The computer storage system of claim 1, wherein the receiving of the first metadata snapshot from the first storage system is triggered by a result of comparing the deletion statistics of the first storage system to one or more predetermined thresholds, the deletion statistics indicating how frequently data is deleted.

* * * * *